United States Patent [19]

Schmitt

[11] 4,228,256
[45] Oct. 14, 1980

[54] TRANSPARENT BLENDS OF RESINOUS COPOLYMERS AND GRAFTED ELASTOMERS

[75] Inventor: Joseph M. Schmitt, Ridgefield, Conn.

[73] Assignee: CY/RO Industries, Stamford, Conn.

[21] Appl. No.: 943,604

[22] Filed: Sep. 18, 1978

[51] Int. Cl.² .................... C08L 9/00; C08L 47/00
[52] U.S. Cl. ....................... 525/302; 260/29.7 UP;
  525/83; 525/243; 525/244; 525/257; 525/265;
  525/305; 525/315; 525/316; 525/416; 525/455;
  525/479; 525/535; 525/316

[58] Field of Search ............ 260/880 R, 881, 878;
  525/243, 244, 257, 265, 302, 315, 316, 322, 324,
  416, 455, 479, 535

[56] References Cited

U.S. PATENT DOCUMENTS 3,849,358  11/1974  Inoue et al. .................... 260/880 R Primary Examiner—J. Ziegler
Attorney, Agent, or Firm—Bruce F. Jacobs

[57] ABSTRACT

The use of a sequential and controlled addition of monomers during grafting to produce grafted elastomers results in blends of the grafted elastomer and a resinuous copolymer which have superior optical properties.

8 Claims, No Drawings

TRANSPARENT BLENDS OF RESINOUS COPOLYMERS AND GRAFTED ELASTOMERS

It has been known to prepare thermoplastic molding compositions from various polymers and rubber latices by blending the polymers with the grafted rubber or by polymerizing the monomers used to produce the polymer in the presence of the rubber. For example, U.S. Pat. No. 3,354,238 discloses such a molding composition wherein the resinous phase is composed of methylmethacrylate, styrene and acrylonitrile, and the rubber phase is composed of polybutadiene grafted with methylmethacrylate, styrene and acrylonitrile. Similarly, U.S. Pat. No. 3,261,887 discloses a molding composition substantially identical to that of the above-discussed patent except that the acrylonitrile is omitted therefrom. Also similarly, U.S. Pat. No. 4,085,116 discloses molding compositions wherein the acrylonitrile has been replaced by ethylacrylate.

These products exhibit acceptable properties when utilized as colored molding compositions, but have deficiencies when used in the absence of a coloring agent. In their uncolored states the products are not sufficiently transparent and, as a result, their use in such as packaging applications has been restricted.

Research has indicated that the optical properties of the molding compositions improve when the rubbery reinforcing elastomer, i.e., the polybutadiene phase in the above patents, is more uniformly distributed in the resinous polymer phase and the agglomerations of the elastomer, if any, are smaller than the wavelength of visible light. The smaller the agglomerations, the better are the optical properties.

While the wavelength of visible light is about 4000 to 7000 Angstroms and the polybutadiene previously used has generally had a diameter on the order of less than 2000 Angstroms, the resultant products have still not been entirely satisfactory due to relatively poor haze and gloss characteristics.

It has now been discovered a better dispersion, i.e., greatly reduced agglomeration, of the grafted rubber in the final product may be obtained by a sequential and controlled addition of monomers during the grafting step. As a result of this non-agglomerating grafting procedure, a molding composition results having good physical properties and greatly improved optical properties when compared with previous products.

The present invention provides improved molding compositions for two phase plastic systems. Examples of the rubbery reinforcing portion of such systems include such as polybutadienes, poly(styrene/butadienes), poly(methylmethacrylate/butadienes), polyisoprenes, polyisobutylenes, poly(isobutylene/isoprene) copolymers, poly(acrylonitrile/butadienes), polyacrylates, polyurethanes, neoprene, silicone rubbers, chlorosulfonated polyethylene, ethylene-propylene rubbers, and other such rubbery materials. rubbers, chlorosulfate polyethylene, ethylene-propylene rubbers, and other such rubbery materials.

Grafted onto the above rubbers may be the monomers detailed below for the resin phase. The monomers to be grafted must be compatible with the particular monomers used in the resin phase for a particular composition. Preferably, the same monomers are used in both. By "compatible" is meant polymers which show a strong affinity for each other such that they can be dispersed into one another in small domain sizes. The smaller the domain sizes, the more compatible are the polymers. Further explanation of compatibility may be found in Advances in Chemistry Series, No.99, "Multi-Component Polymer Systems", edited by R. F. Gould, 1971, incorporated herein by reference.

The resin phase is any polymer or copolymer which is compatible with the grafted rubber phase. Examples of suitable monomers include: acrylates, methacrylates, nitriles, styrenes, vinyl/ethers, vinyl halides and other similar monovinyl compounds. Particularly suitable monomers include methylacrylate, ethylacrylate, propylacrylate, methylmethacrylate, ethylmethacrylate, propylmethacrylate, acrylonitrile, methacrylonitrile, styrene, α-methylstyrene, butyl vinyl ether, and vinyl chloride.

Preferably, for this invention, the rubber phase is polybutadiene grafted with methylmethacrylate, styrene, and optionally methylacrylate, ethylacrylate, or acrylonitrile. Preferably, the resin phase is a terpolymer of methylmethacrylate, styrene, and optionally methylacrylate, ethylacrylate, or acrylonitrile.

Most preferably, the molding compositions are prepared from a graft polybutadiene phase and a polymeric resin phase where the polybutadiene fraction of the graft polybutadiene phase is calculated to be 5 to 25% by weight of the total molding composition. The polymeric resin phase contains about 60 to 80 parts of methylmethacrylate, 15 to 30 parts of styrene, and 0 to 15 parts of either methylacrylate, ethylacrylate or acrylonitrile. The graft polybutadiene is polybutadiene grafted with methylmethacrylate, styrene and optionally either methylacrylate, ethylacrylate or acrylonitrile where the overall ratio of polybutadiene to graft monomers ranges from about 1:1 to about 6:1. The graft monomers are used in a ratio of from about 60 to 85 parts of methylmethacrylate, 15 to 30 parts of styrene and 0 to 15 parts of either methylacrylate, ethylacrylate or acrylonitrile. The grafted polybutadiene is essentially uniformly distributed in the resin phase and is relatively non-agglomerated, i.e., it has essentially no aggregates greater than about 1 micron.

The compositions may be produced by blending the resinous phase, which may be prepared by a free radical initiated reaction in the presence of a solvent and in a two-stage system whereby the monomer blend is charged to a first reactor and polymerized to about 20 to 40% solids and then in a second reactor where complete conversion is carried out, with the rubber phase in the appropriate amounts.

Any known procedure may be utilized to produce the resin phase. It is preferred, however, that the resin phase be produced by blending the appropriate concentration of monomers in a solvent such as toluene at about a 60 to 80% monomers concentration. A suitable initiator such as benzoyl peroxide, di-t-butyl peroxide and the like may be added in the presence of a molecular weight control additive such as an alkyl mercaptan e.g., n-dodecyl mercaptan, n-octyl mercaptan, t-dodecyl mercaptan, benzyl mercaptan and the like. As mentioned above, this polymerization is preferably conducted in a two-stage system whereby the monomer solution is charged to the first stage reactor and polymerized at from about 80° to 110° C. for from about 12 to 24 hours. The rate of conversion is preferably adjusted to from about 1 to 3% solids per hour. The first stage polymer is then preferably transferred to a second stage such as a plug flow reactor where complete conversion of the monomer to polymer is carried out. The final solids content generally ranges from about 60 to 70%. Initiators may be used in amounts ranging from about 0.01 to 5.0 percent by weight, based on the weight of the monomers. The molecular weight control additive can be used in like amounts, by weight, again based on the weight of the monomers.

There may be added to the resin phase, after or during formation, such additives as heat and light stabilizers, antioxidants, lubricants, plasticizers, pigments, fillers, dyes and the like.

The grafted rubber phase is prepared by a sequential and controlled addition of monomers process which inhibits agglomeration and/or aggregation of the rubber particles. In the process which is essentially a standard free radical initiation polymerization, wherein at least the monomer having the best compatibility as a polymer to that of the resin phase is added to the rubber latex and any other monomers which are also being grafted onto the rubber, conventional initiators and other polymerization components are used.

While not being bound by any theory it is believed that the non-agglomeration is caused by putting an essentially uniform shell of resin around the rubber particles wherein the outer layer of the shell is composed primarily of the controllably added monomer.

The monomer being controllably added should be added over a period of at least 15 minutes, preferably at least 1 hour, and most preferably about 1 to 3 hours, with the grafting reaction occuring during the addition and preferably allowed to continue thereafter for about one hour. The initiator when it is a redox type may be included in the reactor initially, it may be added simultaneously with the controlled monomer either in the same stream or in a separate stream; or ultraviolet light may be used generally, the initiator is used in an amount up to about four times the standard amounts used in U.S. Pat. No. 4,085,166. When the initiator is added at the same time as the controlled monomer either the oxidant or reductant portion may be placed in the reactor initially and only the other portion need be controllably added. The reaction is conducted in the pH range of about 6.0 to 8.5 and in the temperature range of about room temperature to about 65° C., though neither has been found to be critical to the present invention.

Examples of suitable redox initiator systems include: t-butyl hydroperoxide, cumene hydroperoxide, hydrogen peroxide, or potassium persulfate-sodium formaldehyde sulfoxylate-iron; hydroperoxides-tetraethylene pentamine or dihydroxyacetone; hydroperoxides-bisulfite systems; and other such well-known systems.

The rubber to total monomer ratio for the graft reaction should be in the range of about 1:1 to as high as about 6:1 with the lower ratios providing the best optical properties and the higher ratios the best impact properties. Preferably, the ratio is in the range of about 1:1 to 5:1, and most preferably 2.5:1 to 4:1.

The resinous phase and the rubbery phases may be blended together in any known manner such as by utilizing a ball mill, hot rolls, emulsion blending, or the like.

It is preferred that the blending operation be carried out in a devolatilizer-extruder in a manner disclosed at column 3, lines 3 to 72 of the above-mentioned U.S. Pat. No. 3,354,238, which section thereof is hereby incorporated herein by reference.

As mentioned above, the compositions of the instant invention have utility where toughness, rigidity and transparency are necessary and may be utilized in the injection molding of highly engineered parts, blow molding and thermoforming of containers or other desired articles.

The following examples are set forth for purposes of illustration only and are not to be construed as limitations on the present invention except as set forth in the appended claims. All parts and percentages are by weight unless otherwise indicated.

EXAMPLE 1

A 71.5/23.5/5/0 methylacrylate/styrene/ethylacrylate terpolymer composition is prepared by polymerizing the following monomer-solvent blend;
51.6 parts methylmethacrylate
17.0 parts styrene
3.6 parts ethylacrylate
27.5 parts toluene
0.022 part n-dodecylmercaptan
0.30 part di-t-butylperoxide The polymerization is carried out in a two-stage system, i.e., the monomer-solvent blend is charged to a first stage reactor and polymerized to about 28 to 30% solids at 90°–95° C. for about 15 hours. The rate of conversion is about 2% solids per hour. The first stage reaction product is then transferred to a plug flow reactor where complete conversion of monomer to polymer is carried out. The final solids content is near 72%.

A graft rubber composition is prepared by charging 79.19 parts of polybutadiene latex (43.3% solids, 34.29 parts of polybutadiene) and 7.48 parts of deionized water to a reactor, and adjusting the pH to about 8.3 with 1.5% aqueous ammonia. To this is charged 2.29 parts of styrene with stirring and the equilibrating mixture is purged with nitrogen to provide a near oxygen-free atmosphere. Then 1.51 parts of sodium formaldehyde sulfoxylate chelate solution of the following composition is added:

| | |
|---|---|
| 96.26% | deionized water |
| 3.51% | sodium formaldehyde sulfoxylate |
| 0.19% | ethylenediamine tetraacetic acid tetra sodium salt |
| 0.04% | ferric chloride hexahydrate |
| 100% | |

After five minutes and continuing the stirring 9.14 parts of methyl methacrylate and 0.39 parts of tert-butyl hydroperoxide soultion (5.85% t-butyl hydroperoxide and 94.15% deionized water) are pumped into the reactor. The methylmethacrylate rate is 0.0508 part per minute for 3 hours. The t-butylhydroperoxide solution rate is 0.0195 part per minute for 10 minutes, then 0.00108 part per minute for 180 minutes. One hour after the monomer addition is completed the conversion to polymer is 98–99%.

Twenty parts of the above grafted rubber are then blended with 80 parts of the above terpolymer so as to provide a final polybutadiene content of 15%. The blending is conducted on a devolalitizer-extruder at a temperature on the inlet end of about 250° F. and at the die end of about 560° F. under a vacuum of 25–27 in Hg.

The resultant transparent composition is then formed into various specimens and tested. The results are given in Table I below along with the results for the conventionally prepared product.

As can be seen from Table I, the sequential and controlled addition of monomers produced a product of equivalent impact strength and greatly superior optical properties (high gloss, lower haze, and increased transmission) as compared to conventionally prepared material.

TABLE I

|  | Notched Izod[a] ft. lbs./in | Gloss %[b] 20° | Gloss %[b] 60° | Total Haze %[c] Y | Total Haze %[c] Z | Y% Transmission |
|---|---|---|---|---|---|---|
| Example 1 | 1.6 | 64 | 86 | 13.0 | 7.8 | 90.5 |
| Comparison | 1.6 | 47 | 81 | 17.0 | 10.0 | 89.8 |

[a]ASTM D 256, method A; molded specimens ¼ × ½ × 5 inches.
[b]ASTM D 2457-70, ⅛ inch molded disks.
[c]ASTM D 1003-61, ⅛ inch molded disks.

EXAMPLES 2-6

The procedure of Example 1 is repeated except varying the rubber to monomer ratio of the graft polymer and the pumping time is 1 hour instead of 3 hours. Comparison products are made by the conventional procedures. Molding compositions are prepared wherein the ratio of the resin phase to the rubber phase is varied such as to produce products having a constant 14.5% polybutadiene.

The results for injection moldings are summarized in Table II below, and for thermoformed moldings 0.012 in. thick in Table III below.

TABLE II

|  | Rubber to Monomer Ratio | Notched Izod fppi | Gloss % 20° | Gloss % 60° | Total Haze % Y | Total Haze % Z | % Y Transmission |
|---|---|---|---|---|---|---|---|
| Ex. 2 | 1/1 | 0.41 | 69 | 89 | 6.4 | 7.3 | 86.4 |
| Comp. | 1/1 | 0.47 | 58 | 83 | 11.8 | 13.6 | 78.4 |
| Ex. 3 | 2/1 | 0.54 | 62 | 86 | 8.7 | 10.7 | 84.3 |
| Comp. | 2/1 | 0.81 | 59 | 84 | 9.0 | 10.3 | 84.1 |
| Ex. 4 | 3/1 | 2.1 | 60 | 86 | 9.5 | 11.1 | 83.8 |
| Comp. | 3/1 | 1.9 | 58 | 85 | 12.9 | 13.8 | 83.1 |
| Ex. 5 | 4/1 | 2.0 | 54 | 83 | 10.2 | 11.0 | 86.0 |
| Comp. | 4/1 | 1.6 | 57 | 83 | 15.9 | 17.3 | 77.0 |
| Ex. 6 | 5/1 | 1.7 | 52 | 81 | 11.3 | 12.0 | 84.7 |

TABLE III

|  | Gloss % 20 | Gloss % 60° | Total Haze % Y | Total Haze % Z | % Y Transmission |
|---|---|---|---|---|---|
| Ex. 4 | 61 | 89 | 3.0 | 4.2 | 92.5 |
| Comparison | 51 | 87 | 3.1 | 4.2 | 92.7 |

EXAMPLES 7-24

The procedure of Example 1 is repeated while varying (1) the rubber to monomer ratio of the grafted rubber, (2) the pumping times, (3) putting the t-butylhydroperoxide in the reactor initially, and (4) the amount of each part of the initiator system (the amounts of Ex. 1 being the standard-STD).

The variations together with the properties of resultant molding compositions which are made to each have 14.5% polybutadiene are summarized in Table IV below. In the table: MMA is methylmethacrylate; TBHP is t-butylhydroperoxide; and SFS-Chelate is sodium formaldehyde sulfoxylate-chelate solution.

TABLE IV

| Ex. | Rubber to Monomer Ratio | Pump Times (hr.) MMA | Pump Times (hr.) TBHP | Initiator Conc. TBHP | Initiator Conc. SFS-chelate | Notched Izod fppi | Gloss % 20° | Gloss % 60° | Total Haze % Y | Total Haze % Z | Y Transmission % |
|---|---|---|---|---|---|---|---|---|---|---|---|
| 7 | 3/1 | 0.25 | 0 | STD | STD | 1.8 | 53 | 83 | 15.8 | 17.3 | 74.5 |
| 8 | " | 0.25 | 0.25 | STD | STD | 1.6 | 62 | 84 | 19.7 | 20.3 | 72.7 |
| 9 | " | 0.25 | 0 | 4 STD | 4 STD | 1.9 | 51 | 80 | 17.3 | 16.7 | 81.6 |
| 10 | " | 0.25 | 0.25 | 4 STD | 4 STD | 1.9 | 55 | 82 | 18.2 | 18.1 | 79.7 |
| 11 | " | 1 | 1 | STD | .5 STD | 1.9 | 63 | 86 | 10.1 | 11.4 | 84.0 |
| 12 | " | 1 | 1 | STD | STD | 2.1 | 60 | 86 | 9.5 | 11.1 | 83.8 |
| 13 | " | 1 | 1 | 2.5 STD | 1.2 STD | 1.9 | 54 | 82 | 8.5 | 10.6 | 87.1 |
| 14 | " | 1 | 1 | 4 STD | 2 STD | 1.8 | 57 | 83 | 10.2 | 12.8 | 79.2 |
| 15 | " | 1 | 1 | 4 STD | 4 STD | 1.8 | 54 | 82 | 9.9 | 11.9 | 80.7 |
| 16 | " | 2 | 0 | STD | STD | 1.5 | 60 | 85 | 14.4 | 15.8 | 78.9 |
| 17 | " | 3 | 0 | STD | STD | 2.0 | 34 | 74 | 17.9 | 19.3 | 84.3 |
| 18 | " | 3 | 3 | STD | STD | 2.0 | — | — | — | — | — |
| 19 | " | 3 | 3 | 4 STD | 2 STD | 1.3 | — | — | 7.8 | 11.0 | 87.0 |
| 20 | " | 5 | 0 | STD | STD | 1.6 | 60 | 85 | 11.5 | 11.9 | 83.4 |
| 21 | 1/1 | 1.25 | 1.25 | 2.5 STD | 1.2 STD | 0.37 | 66 | 86 | 9.6 | 11.3 | 83.2 |
| 22 | " | 1 | 1 | 4 STD | 2 STD | 0.35 | 65 | 85 | 6.4 | 7.5 | 67.6 |
| 23 | " | 3 | 3 | 4 STD | 2 STD | 0.32 | 68 | 87 | 6.3 | 8.0 | 84.7 |
| 24 | " | 5 | 5 | 4 STD | 2 STD | 0.29 | 67 | 84 | 5.8 | 7.2 | 66.4 |

EXAMPLES 25-29

The procedure of Example 1 is repeated except varying the initiator and pumping times. The STD level for each initiator is the equivalent mole basis based on the ti-butylhydroperoxide of Example 1.

The results are as in Table V below.

TABLE V

| Ex. | Initiator | Pump Times (hr.) MMA | Pump Times (hr.) Init. | Initiator Conc. Init. | Initiator Conc. SFS-Chelate | Notched Izod fppi | Gloss % 20° | Gloss % 60° | Total Haze, % Y | Total Haze, % Z | Y Transmission, % |
|---|---|---|---|---|---|---|---|---|---|---|---|
| 25 | CHP[(1)] | 1 | 1 | STD | STD | 1.5 | 56 | 81 | 9.6 | 10.4 | 85.6 |
| 26 | $H_2O_2$ | 1 | 1 | STD | STD | 1.8 | 55 | 82 | 12.6 | 12.8 | 84.6 |
| 27 | $H_2O_2$ | 3 | 3 | STD | STD | 1.8 | 49 | 80 | — | — | — |
| 28 | $(NH_4)_2S_2O_8$ | 1 | 1 | STD | .5 STD | 1.7 | 57 | 84 | 10.2 | 12.1 | 82.6 |

TABLE V-continued

| Ex. | Initiator | Pump Times (hr.) MMA | Init. | Initiator Conc. Init. | SFS-Chelate | Notched Izod fppi | Gloss % 20° | 60° | Total Haze, % Y | Z | Y Transmission, % |
|---|---|---|---|---|---|---|---|---|---|---|---|
| 29 | $K_2S_2O_8$ | 1 | 1 | STD | .5 STD | 1.5 | 59 | 83 | 9.5 | 10.0 | 83.3 |

(1)Cumene hydroperoxide

EXAMPLE 30

The procedure of Example 1 is repeated except the t-butylhydroperoxide is placed in the reactor and the sodium formaldehyde sulfoxylate-chelate solution is metered in. The time of pumping for both the methylmethacrylate and the solution is one hour. Standard amounts of the initiator are used.

The resultant product (14.5% polybutadiene) shows the following properties:

| | |
|---|---|
| Notched Izod, fppi | 2.1 |
| Gloss, % 20° | 47 |
| 60° | 81 |
| Total Haze, % Y | 13.4 |
| Z | 15.5 |
| Y Transmission, % | 83.8 |

EXAMPLE 31

The process of Example 1 is repeated except that a mixture of methylmethacrylate and styrene monomer is metered into the reactor. The pumping time is one hour for both the monomers and the initiator. The resultant composition with 14.5% polybutadiene has the following properties:

| | |
|---|---|
| Notched Izod, fppi | 2.2 |
| Gloss, % 20° | 58 |
| 60° | 84 |
| Total Haze, % Y | 8.5 |
| Z | 9.4 |
| Y Transmission, % | 86.4 |

EXAMPLE 32

The procedure of Example 1 is repeated except that a portion of the methylmethacrylate which is metered in is replaced by ethylacrylate and the pumping time is one hour. The resultant composition, having 14.5% polybutadiene, has the following properties:

| | |
|---|---|
| Notched Izod, fppi | 2.0 |
| Gloss, % 20° | 51 |
| 60° | 81 |
| Total Haze, % Y | 11.1 |
| Z | 15.3 |
| Y Transmission, % | 84.8 |

EXAMPLES 33-35

The procedure of Example 1 is repeated except that molding compositions are prepared with varying amounts of polybutadiene in the final product. The results are as shown in Table VI.

TABLE VI

| Ex. | % Polybutadiene | Notched Izod fppi | Gloss % 20° | 60° | Total Haze, % Y | Z | Transmission, % |
|---|---|---|---|---|---|---|---|
| 33 | 14.5 | 2.2 | 59 | 86 | 10.0 | 12.1 | 84.9 |
| 34 | 12.5 | 2.0 | 58 | 86 | 9.3 | 11.3 | 84.1 |
| 35 | 10.5 | 1.7 | 64 | 87 | 8.0 | 9.6 | 86.2 |

EXAMPLE 36-37

The procedure of Example 4 is repeated to produce thermoformed moldings having a thickness of 0.004-0.0065 inches. The moldings are evaluated for optical properties in comparison with conventially prepared material. The results are shown in Table VII.

TABLE VII

| EXAMPLE | % POLYBUTADIENE | Gloss, % 20° | 60° | TOTAL HAZE, % Y | Z | Y TRANSMISSION % |
|---|---|---|---|---|---|---|
| 36 | 14.5 | 20 | 67 | 20.0 | 26.7 | 91.5 |
| 37 | 12.5 | 32 | 76 | 15.5 | 17.2 | 91.7 |
| COMParISON | 14.5 | 9 | 59 | 23.1 | 30.9 | 91.3 |

EXAMPLES 38-39

The procedure of Example 4 is repeated to produce 16 oz. margarine tubs by thermoforming a 0.035 in. thick extruded sheet at 350°–365° F. The rubber phase has a rubber-to-monomer ratio of 3/1, and the overall compositions contain 14.5% polybutadiene. The results are shown in Table VIII.

TABLE VIII

| EXAMPLE | PUMP TIMES MMA | INIT. | 0.02 IN. THICK DART IMPACT STRENGTH (FPPI) | GLOSS, % SIDE- 0.011 IN. THICK 20° | 60° | BOTTOM- 0.017 IN. THICK 20° | 60° |
|---|---|---|---|---|---|---|---|
| 38 | 3 | 0 | 25.2 | 19 | 65 | 42 | 82 |
| Comp. | — | — | 30.3 | 2 | 36 | 19 | 61 |
| 39 | 3 | 3 | 29.6 | 10 | 55 | 45 | 81 |
| Comp. | — | — | 30.0 | 2 | 30 | 17 | 63 |

EXAMPLE 40

The procedure of Example 38 is repeated except varying the forming temperature of the margarine tubs. The results shown in Table IX demonstrate that the visual clarity of thermoformed compositions of the present invention is essentially insensitive to variations in forming temperature whereas conventionally prepared materials deteriorate in visual clarity as the temperature increases.

TABLE IX

| EXAMPLE | FORMING TEMPERATURE, °F. | | | | | | |
|---|---|---|---|---|---|---|---|
| | 300 | 335 | 345 | 355 | 360 | 380 | 390 |
| 40 | Good | Good | | Good | | | Good-Fair |
| Comparison | Fair | | Fair-Poor | | Poor | Poor | |

What is claimed is:

1. A method of preparing a non-agglomerating, readily dispersible grafted rubber comprising: (1) placing a rubber latex in a reaction vessel; (2) adding thereto one or more monomers to be grafted thereon; (3) equilibrating said rubber latex; (4) controllably adding to said equilibrated rubber latex and said monomers at least one monomer to be grafted thereon, wherein the addition of said monomer takes at least 15 minutes and is in the substantial absence of added emulsifier; during which time a grafting reaction occurs.

2. The method of claim 1 wherein a redox initiator is used.

3. The method of claim 2 wherein either the reductant or the oxidant portion of the initiator is controllably added at the same time as the monomer which is controllably added.

4. The method of claim 1 wherein one or more other graftable monomers are placed in the reaction vessel along with the rubber latex.

5. The method of claim 4 wherein said other graftable monomers are styrene and optionally a monomer selected from methylacrylate, ethylacrylate and acrylonitrile.

6. The method of claim 1 wherein the rubber latex is polybutadiene and the monomer controllably added is methylmethacrylate.

7. The method of claim 1 wherein a pH of from about 6 to 8.5 is used.

8. The method of claim 1 wherein a temperature of about 20° to 65° C. is used.

* * * * *